(12) United States Patent
Tin

(10) Patent No.: US 10,122,475 B1
(45) Date of Patent: Nov. 6, 2018

(54) SYSTEMS AND METHODS FOR GENERATING AND TRANSMITTING ULF/VLF SIGNALS

(71) Applicant: Honeywell International Inc., Morris Plains, NJ (US)

(72) Inventor: Steven Tin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/812,532

(22) Filed: Nov. 14, 2017

(51) Int. Cl.
*H04B 13/02* (2006.01)

(52) U.S. Cl.
CPC .................... *H04B 13/02* (2013.01)

(58) Field of Classification Search
CPC ............ H04B 13/02; H01L 2924/1461; G02B 26/0841; G02B 26/085; H01H 59/0009; H01H 1/0036; H03H 3/007; H03H 3/0072; H03H 9/2405; H03H 9/00; H03H 2007/006; H01Q 3/32; H01Q 1/36
See application file for complete search history.

(56) References Cited

U.S. PATENT DOCUMENTS

| | | | | |
|---|---|---|---|---|
| 5,825,718 | A * | 10/1998 | Ueki ...................... | H04B 11/00 367/132 |
| 6,046,705 | A * | 4/2000 | Anderson ................ | H01Q 1/26 343/701 |
| 7,825,863 | B2 * | 11/2010 | Martiskainen ......... | H01Q 1/243 343/700 MS |
| 8,228,251 | B1 * | 7/2012 | Behdad ................... | H01Q 7/00 343/742 |
| 2003/0090645 | A1 * | 5/2003 | Kato ....................... | F16F 15/02 355/72 |
| 2006/0085160 | A1 * | 4/2006 | Ouchi ................. | G01N 21/3581 702/150 |
| 2006/0151613 | A1 * | 7/2006 | Zmood ................... | G06K 7/086 235/492 |

(Continued)

OTHER PUBLICATIONS

Behdad et al., "Ultrawide Band, Compact Antenna for Low Frequency Applications, Including Military Vehicles and Wireless Communications", Wisconsin Alumni Research Foundation, Date downloaded Oct. 24, 2017, pp. 1-2.

(Continued)

*Primary Examiner* — Devan Sandiford
(74) *Attorney, Agent, or Firm* — Fogg & Powers LLC

(57) ABSTRACT

A system for generating and transmitting ULF/VLF signals comprises a plurality of MEMS transmitter devices arranged in an array. Each transmitter device includes a first ground plane; a beam coupled to the first ground plane by an anchor, such that the beam extends over and is spaced apart from the first ground plane; an electret coupled to the beam and spaced apart from the first ground plane; an electrical bias drive coupled to the beam to generate a stress on the beam; and a second ground plane spaced above the beam. The system also comprises a vibration drive stage operatively coupled to each transmitter device. The vibration drive stage synchronically drives each transmitter device such that each electret vibrates in a substantially perpendicular direction with respect to the first and second ground planes. Each electret also vibrates at substantially the same modulated frequency to generate and transmit ULF/VLF signals.

20 Claims, 3 Drawing Sheets

(56) References Cited

U.S. PATENT DOCUMENTS

2008/0224568 A1* 9/2008 Kvisteroy .............. G01D 21/00
                                                    310/336
2016/0226137 A1* 8/2016 Bickford .................. H01Q 9/04

OTHER PUBLICATIONS

DARPA, "Underwater Radio, Anyone?", https://www.darpa.mil/news-events/2016-12-16, Dec. 16, 2016, pp. 1-4.

* cited by examiner

SYSTEMS AND METHODS FOR GENERATING AND TRANSMITTING ULF/VLF SIGNALS

BACKGROUND

Ultra-Low Frequency (ULF) signals, ranging from 300 Hz to 3 kHz, can penetrate through conductive media, such as water, metal, soil, rock, and building materials, for hundreds of meters. Penetration is possible due to the relatively large skin depth in these materials, which grows as the carrier frequency is reduced. Very-Low-Frequency (VLF) signals, ranging from 3 kHz to 30 kHz, are typically used for long distance communications, such as between a base station and submarines located on the other side of world.

There is a tremendous amount of interest in the defense community for portable ULF/VLF transmitters for underwater, underground, and other communications. The current ULF technology employs large electromagnetic coils that weigh hundreds of pounds while consuming hundreds of kilowatts, which makes them impossible for portable deployments.

Due to the long wavelengths and unique applications, little advancement has been made in device miniaturization and integration in the ULF/VLF bands. Thus, there are still no portable ULF/VLF transmitters available. For many defense applications, the ability to communicate underwater, underground, or through cave walls, would be of great interest.

SUMMARY

A system for generating and transmitting ULF or VLF signals is disclosed. The system comprises a plurality of MEMS transmitter devices arranged in a device array. Each of the MEMS transmitter devices includes a first ground plane; a beam having a proximal end and a distal end, wherein the proximal end of the beam is coupled to the first ground plane by an anchor, such that the beam extends over and is spaced apart from the first ground plane; an electret coupled to the distal end of the beam and spaced apart from the first ground plane; an electrical bias drive coupled to the beam and configured to generate a stress on the beam; and a second ground plane spaced above the beam. The system also comprises a vibration drive stage operatively coupled to each MEMS transmitter device. The vibration drive stage is configured to synchronically drive each MEMS transmitter device such that each electret vibrates in a substantially perpendicular direction with respect to the first and second ground planes. Each electret also vibrates at substantially the same modulated frequency to generate and transmit ULF or VLF signals.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for providing synchronically driven high efficiency Ultra-Low Frequency (ULF) or Very-Low-Frequency (VLF) transmitters are disclosed herein. A ULF/VLF transmitter according to the present approach comprises an array of individual micro-electro-mechanical systems (MEMS) transmitter devices or resonators, each of which includes an electret mounted on a vibrating beam. The transmitter synchronically controls the low vibration frequency of all the resonators in the array with an independent external drive source that can either be incorporated inside a packaged transmitter array, or generated outside the packaged transmitter array.

The generation and transmission of ULF/VLF signals can be achieved by vibrating high charge density electrets perpendicular to a ground plane in the array. As the electrets vibrate, a magnetic field is radiated at the vibration frequency. By decoupling the vibration driving by the external drive source from the individual transmitter devices, the system complexity is greatly reduced, which enables efficient synchronic large array operation. The vibration amplitude of the transmitter devices is also not limited by the driving capability of the MEMS structure, thus more energy can be radiated. In addition, the transmitter devices can be optimized to be resonant at the desired ULF/VLF frequencies.

The present systems and methods provide a ULF generation and transmission technology that can enable miniature passive transmitters for portable underground and underwater communications. By utilizing high quality factor and low loss MEMS structures, high charge density electrets, and a large amplitude externally driven mechanism, such miniature passive transmitters can be produced. The proposed technology can also be utilized for signal generation in the VLF domain for long distance communications.

Further details of the present system and method are described hereafter with reference to the drawings.

Figure 1:
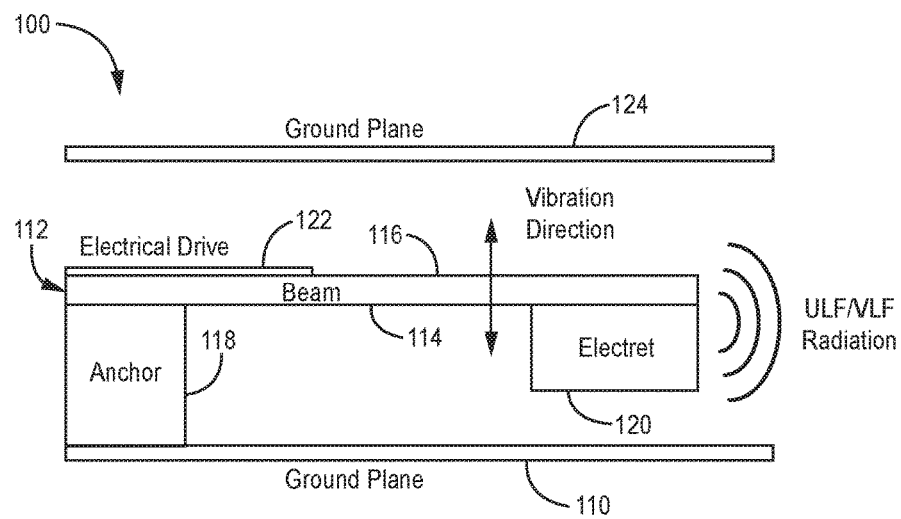
FIG. 1 is a cross section view of a single ULF/VLF transmitter device, according to one embodiment.

FIG. 1 illustrates a single ULF/VLF MEMS transmitter device 100, according to one embodiment. The transmitter device 100 includes a first ground plane 110, and a beam 112 having a lower surface 114 and an upper surface 116. An anchor 118 is coupled between ground plane 110 and lower surface 114 at a proximal end of beam 112, such that beam 112 extends over and is spaced apart from ground plane 110. An electret 120 is coupled to lower surface 114 at a distal end of beam 112. The electret 120 faces and is spaced apart from ground plane 110. An electrical drive 122 is coupled to upper surface 116 of beam 112, and is configured to generate a stress on beam 112 through an electrical bias. A second ground plane 124 is spaced above beam 112. The ground plane 124 is included to balance out the electrostatic force on electret 120.

When a stress signal on beam 112 is generated through an electrical actuation, beam 112 and electret 120 vibrate in a substantially perpendicular direction with respect to first ground plane 110 and second ground plane 124. The vibration of electret 120 is done at a frequency to produce ULF or VLF radiation.

The transmitter device 100 can be fabricated using conventional MEMS fabrication technology. The beam 112 can be made from any MEMS compatible material, such as silicon, silicon oxide, metal, and the like.

The electret 120 can be composed of an inorganic electret material (e.g., silicon dioxide), or an organic electret material (e.g., polymer). Electrets are dielectric materials with quasi-permanently embedded static electric charges and/or quasi-permanently polarized dipoles.

The electrical drive 122 can be integrated with beam 112 during fabrication of transmitter device 100. The electrical drive 122 can be implemented as an electrostatic, thermoelectric, or piezoelectric driving mechanism, in order to generate the beam vibration.

Figure 2:
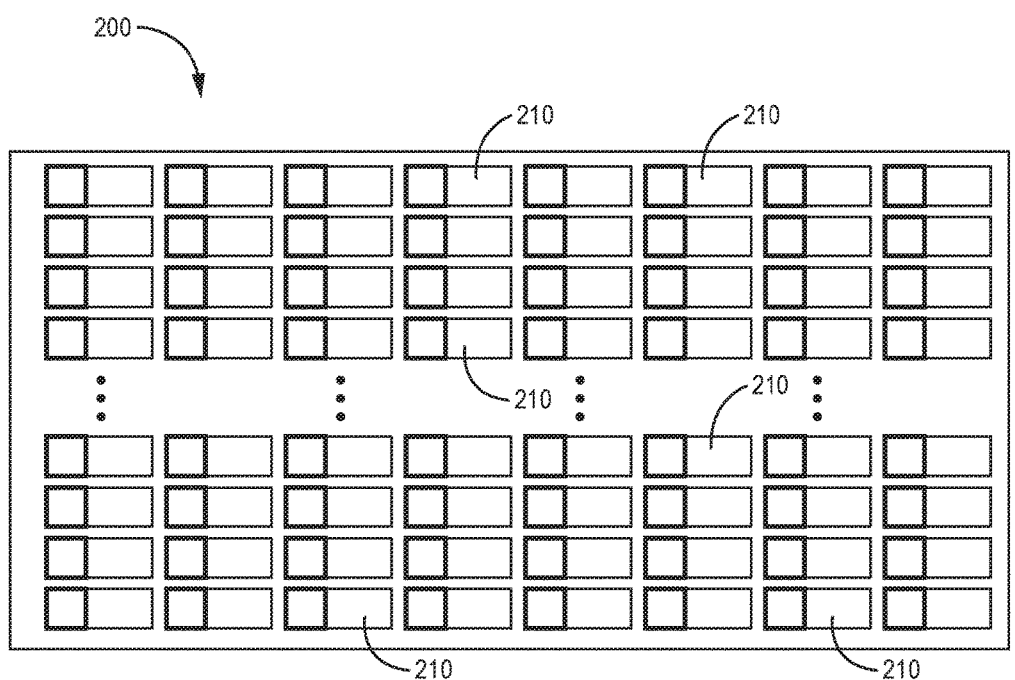
FIG. 2 is a plan view of a ULF/VLF transmitter array, according to one implementation.

To generate sufficient ULF/VLF signals for communication applications, hundreds to thousands of MEMS transmitter devices are required to operate synchronically in an array. FIG. 2 depicts a ULF/VLF transmitter array 200, according to one exemplary implementation. The transmitter array 200 includes multiple MEMS transmitter devices 210, each of which can correspond to transmitter device 100 (FIG. 1). The transmitter devices 210 can be arranged in multiple rows and columns, as shown in FIG. 2.

It can be difficult to synchronically drive a large MEMS array, such as transmitter array 200, with integrated electrical drive 122 shown in FIG. 1, as there are challenges with electrical routing, impedance matching, defects, etc. Furthermore, the displacement of device integrated drives is often limited, which limits the radiated ULF/VLF signal strength. Accordingly, together with the device level innovation, an external vibration drive mechanism is described herein that is implemented to excite the ULF/VLF transmitter array.

Figure 3:
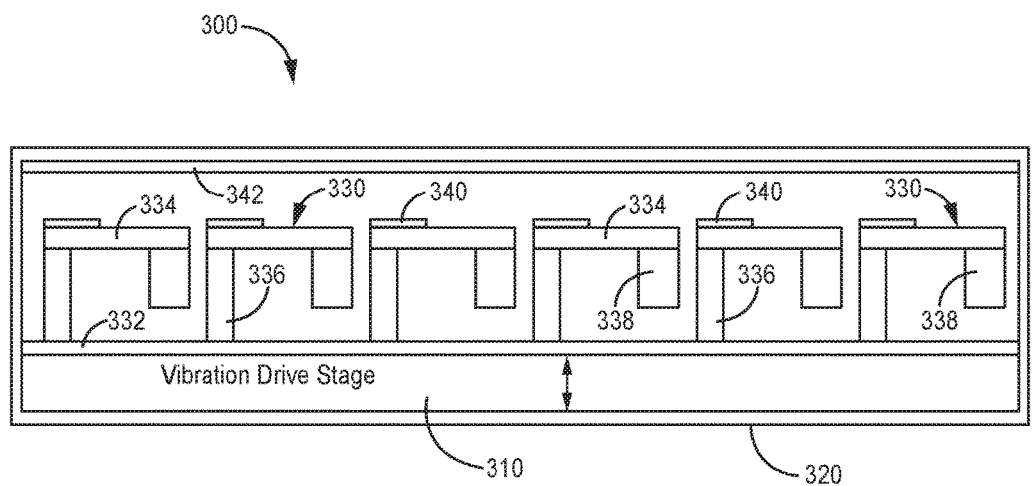
FIG. 3 is a cross section view of a ULF/VLF transmitter array package, according to one embodiment, in which a vibration drive mechanism is integrated inside the package.

FIG. 3 illustrates a ULF/VLF transmitter array package 300, according to one embodiment, in which a vibration drive stage 310 is integrated inside a vacuum package 320. A plurality of MEMS transmitter devices 330 is located inside of vacuum package 320. Each of transmitter devices 330 are coupled to a first ground plane 332, which is located over vibration drive stage 310. Each of transmitter devices 330 includes a beam 334 that is coupled to ground plane 332 by an anchor 336, such that each beam 334 extends over and is spaced apart from ground plane 332. An electret 338 is coupled to a distal end of each beam 334 and is spaced apart from ground plane 332.

An electrical bias 340 can be coupled to each beam 334, with each electrical bias 340 in electrical communication with vibration drive stage 310. Unlike electrical drive 122 in FIG. 1, electrical bias 340 is optional and used to change the resonant frequencies of each beam 334. The electrical bias 340 is not used to generate beam vibration, which is done by vibration drive stage 310. A second ground plane 342 is spaced above each beam 334. The vibration drive stage 310 can be implemented as an electrostatic or piezoelectric driving mechanism, for example, in order to generate the beam vibration.

Figure 4:
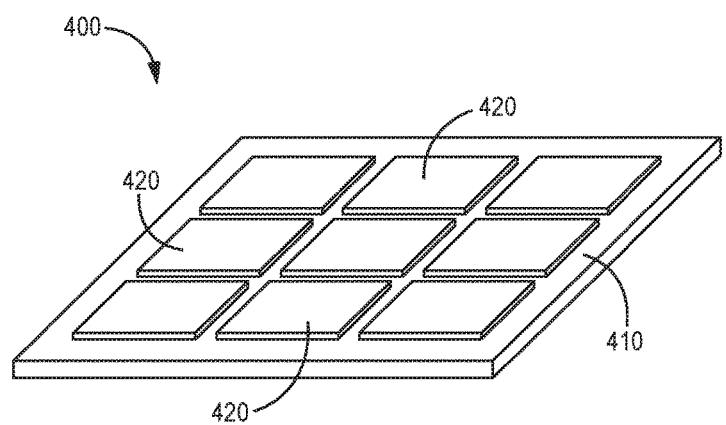
FIG. 4 is a perspective view of a ULF/VLF transmitter array system, according to another embodiment, in which an external vibration drive stage is implemented for driving multiple transmitter array packages.

FIG. 4 illustrates a ULF/VLF transmitter array system 400, according to another embodiment, in which a single external vibration drive stage 410 is implemented for driving multiple transmitter array packages 420. A plurality of MEMS transmitter devices, such as described in previous embodiments, is located inside each of transmitter array packages 420. The vibration drive stage 410 can be implemented as an electrostatic or piezoelectric driving mechanism, for example, in order to generate the beam vibration in each of transmitter array packages 420.

Figure 5:
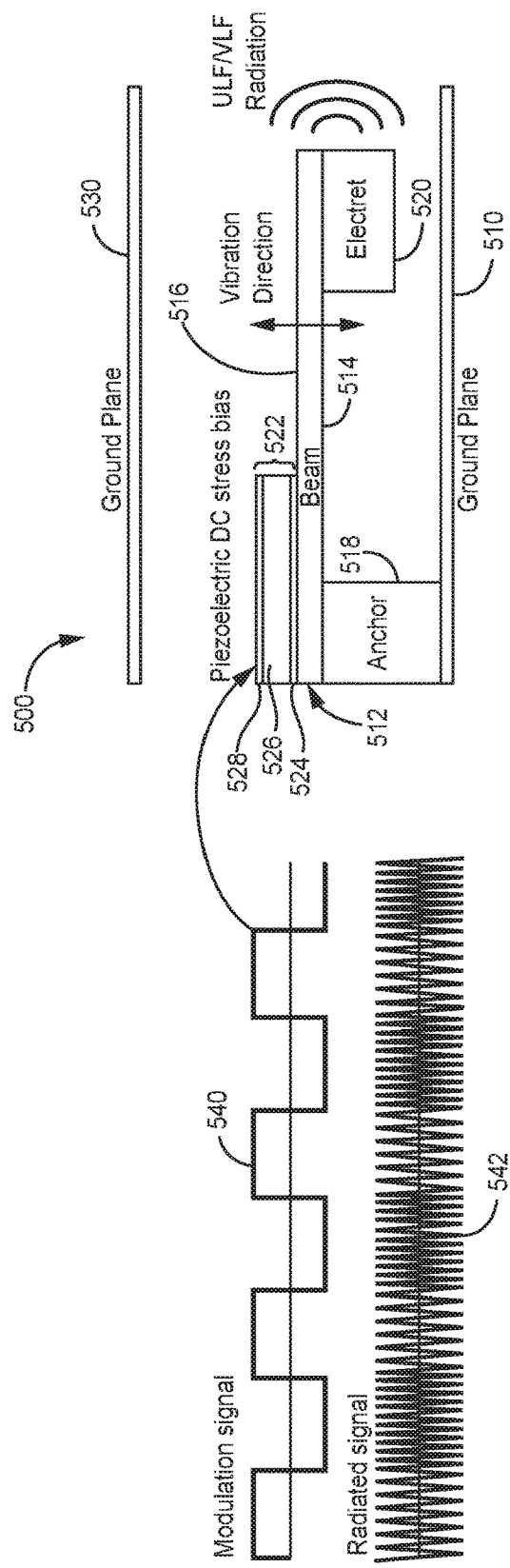
FIG. 5 is a cross section view of a single ULF/VLF transmitter device, according to a further embodiment, which performs ULF/VLF signal modulation with integrated piezoelectric frequency tuning.

FIG. 5 depicts a MEMS ULF/VLF transmitter device 500, according to a further embodiment, which performs ULF/VLF signal modulation with integrated piezoelectric frequency tuning. The transmitter device 500 includes a first ground plane 510, and a beam 512 having a lower surface 514 and an upper surface 516. An anchor 518 is coupled between ground plane 510 and lower surface 514, such that beam 512 extends over and is spaced apart from ground plane 510. An electret 520 is coupled to lower surface 514 of beam 512. The electret 520 faces and is spaced apart from ground plane 510.

A piezoelectric drive 522 is coupled to upper surface 516 of beam 512, and is configured to apply a piezoelectric DC stress bias on beam 512. The piezoelectric drive 522 can include a bottom electrode 524 on beam 512, a piezoelectric layer 526 over bottom electrode 524, and a top electrode 528 over piezoelectric layer 526. A second ground plane 530 is spaced above beam 512 and is configured to balance out the electrostatic force on electret 520. When a DC stress bias is applied to beam 512 by piezoelectric drive 522, the resonant frequency of beam 512 and electret 520 changes with frequency shift controlled by amplitude of the DC bias voltage.

Multiple transmitter devices that correspond to transmitter device 500 can be fabricated using conventional MEMS fabrication technology, and packaged in an array to produce a ULF/VLF transmitter array system. When implemented in an array, the transmitter devices are optimized to be resonant at the desired ULF/VLF frequencies. For frequency shift key signal transmission, a modulation signal 540 can be applied to piezoelectric drive 522 to modulate a radiated signal 542, and thus encode data onto radiated signal 542. When the signal is high, a stress is generated by piezoelectric layer 526, which changes the beam resonance (with the vibration drive changes), and thus the output signal frequency. The modulation signal can be at a low frequency, such as less than about 1 Hz, and thus poses little routing and impedance matching challenges.

In another implementation, elimination of routing can be achieved by integrating photovoltaics onto the beams to drive the piezoelectric layer. An external light source can be utilized to modulate the signal. In a further implementation, the vibration driving amplitude can be increased. The resonant frequencies of the transmitters change with vibration amplitude due to spring softening effects, thus achieving the frequency modulation.

EXAMPLE EMBODIMENTS

A system for generating and transmitting ULF or VLF signals, the system comprising a plurality of MEMS transmitter devices arranged in a device array, each of the MEMS transmitter devices comprising: a first ground plane; a beam having a proximal end and a distal end, wherein the proximal end of the beam is coupled to the first ground plane by an anchor, such that the beam extends over and is spaced apart from the first ground plane; an electret coupled to the distal end of the beam and spaced apart from the first ground plane; an electrical bias drive coupled to the beam and configured to generate a stress on the beam; and a second ground plane spaced above the beam. A vibration drive stage is operatively coupled to each MEMS transmitter device, with the vibration drive stage configured to synchronically drive each MEMS transmitter device such that each electret vibrates in a substantially perpendicular direction with respect to the first and second ground planes, wherein each electret vibrates at substantially the same modulated frequency to generate and transmit ULF or VLF signals.

Example 2 includes the system of Example 1, wherein the beam comprises silicon, silicon dioxide, or a metal.

Example 3 includes the system of any of Examples 1-2, wherein the electret comprises an inorganic electret.

Example 4 includes the system of any of Examples 1-2, wherein the electret comprises an organic electret.

Example 5 includes the system of any of Examples 1-4, wherein the electrical bias drive is integrated with the beam.

Example 6 includes the system of any of Examples 1-5, wherein the electrical bias drive comprises an electrostatic driving mechanism, a thermoelectric driving mechanism, or a piezoelectric driving mechanism.

Example 7 includes the system of any of Examples 1-6, wherein the MEMS transmitter devices are located within a vacuum package.

Example 8 includes the system of Example 7, wherein the vibration drive stage is located within the vacuum package.

Example 9 includes the system of any of Examples 1-6, wherein the MEMS transmitter devices are located within a plurality of vacuum packages arranged in a package array.

Example 10 includes the system of Example 9, wherein the vibration drive stage is external to the vacuum packages of the package array.

Example 11 includes the system of any of Examples 1-10, wherein the MEMS transmitter devices are configured for ULF or VLF signal modulation using integrated piezoelectric frequency tuning.

Example 12 includes a method of fabricating a transmitter array for ULF or VLF signals, the method comprising forming a plurality of MEMS transmitter devices in an array, each of the MEMS transmitter devices formed by a process comprising: forming a first ground plane; forming a beam having a proximal end and a distal end, wherein the proximal end of the beam is coupled to the first ground plane by an anchor, such that the beam extends over and is spaced apart from the first ground plane; forming an electret on the distal end of the beam such that the electret is spaced apart from the first ground plane; forming an electrical bias drive on the beam that is configured to generate a stress on the beam; and forming a second ground plane spaced above the beam. A vibration drive stage is coupled to the array to synchronically drive each MEMS transmitter device such that each electret vibrates in a substantially perpendicular direction with respect to the first and second ground planes, wherein each electret is formed to vibrate at substantially the same modulated frequency to generate and transmit ULF or VLF signals.

Example 13 includes the method of Example 12, wherein the beam is formed with a material comprising silicon, silicon dioxide, or a metal.

Example 14 includes the method of any of Examples 12-13, wherein the electret is formed with a material comprising an inorganic electret.

Example 15 includes the method of any of Examples 12-13, wherein the electret is formed with a material comprising an organic electret.

Example 16 includes the method of any of Examples 12-15, wherein the electrical bias drive is integrated with the beam.

Example 17 includes the method of any of Examples 12-16, wherein the MEMS transmitter devices are formed within a vacuum package.

Example 18 includes the method of Example 17, wherein the vibration drive stage is located within the vacuum package.

Example 19 includes the method of any of Examples 12-16, wherein the MEMS transmitter devices are formed within a plurality of vacuum packages arranged in a package array.

Example 20 includes the method of Example 19, wherein the vibration drive stage is external to the vacuum packages of the package array.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for generating and transmitting ultra-low frequency (ULF) or very-low-frequency (VLF) signals, the system comprising:
   a plurality of micro-electro-mechanical systems (MEMS) transmitter devices arranged in a device array, each of the MEMS transmitter devices comprising:
   a first ground plane;
   a beam having a proximal end and a distal end, wherein the proximal end of the beam is coupled to the first ground plane by an anchor, such that the beam extends over and is spaced apart from the first ground plane;
   an electret coupled to the distal end of the beam and spaced apart from the first ground plane;
   an electrical bias drive coupled to the beam and configured to generate a stress on the beam; and
   a second ground plane spaced above the beam; and
   a vibration drive stage operatively coupled to each MEMS transmitter device, the vibration drive stage configured to synchronically drive each MEMS transmitter device such that each electret vibrates in a substantially perpendicular direction with respect to the first and second ground planes;
   wherein each electret vibrates at substantially the same modulated frequency to generate and transmit ULF or VLF signals.

2. The system of claim 1, wherein the beam comprises silicon, silicon dioxide, or a metal.

3. The system of claim 1, wherein the electret comprises an inorganic electret.

4. The system of claim 1, wherein the electret comprises an organic electret.

5. The system of claim 1, wherein the electrical bias drive is integrated with the beam.

6. The system of claim 1, wherein the electrical bias drive comprises an electrostatic driving mechanism, a thermoelectric driving mechanism, or a piezoelectric driving mechanism.

7. The system of claim 1, wherein the MEMS transmitter devices are located within a vacuum package.

8. The system of claim 7, wherein the vibration drive stage is located within the vacuum package.

9. The system of claim 1, wherein the MEMS transmitter devices are located within a plurality of vacuum packages arranged in a package array.

10. The system of claim 9, wherein the vibration drive stage is external to the vacuum packages of the package array.

11. The system of claim 1, wherein the MEMS transmitter devices are configured for ULF or VLF signal modulation using integrated piezoelectric frequency tuning.

12. A method of fabricating a transmitter array for ultra-low frequency (ULF) or very-low-frequency (VLF) signals, the method comprising:
  forming a plurality of micro-electro-mechanical systems (MEMS) transmitter devices in an array, each of the MEMS transmitter devices formed by a process comprising:
    forming a first ground plane;
    forming a beam having a proximal end and a distal end, wherein the proximal end of the beam is coupled to the first ground plane by an anchor, such that the beam extends over and is spaced apart from the first ground plane;
    forming an electret on the distal end of the beam such that the electret is spaced apart from the first ground plane;
    forming an electrical bias drive on the beam that is configured to generate a stress on the beam; and
    forming a second ground plane spaced above the beam; and
  coupling a vibration drive stage to the array to synchronically drive each MEMS transmitter device such that each electret vibrates in a substantially perpendicular direction with respect to the first and second ground planes, wherein each electret is formed to vibrate at substantially the same modulated frequency to generate and transmit ULF or VLF signals.

13. The method of claim 12, wherein the beam is formed with a material comprising silicon, silicon dioxide, or a metal.

14. The method of claim 12, wherein the electret is formed with a material comprising an inorganic electret.

15. The method of claim 12, wherein the electret is formed with a material comprising an organic electret.

16. The method of claim 12, wherein the electrical bias drive is integrated with the beam.

17. The method of claim 12, wherein the MEMS transmitter devices are formed within a vacuum package.

18. The method of claim 17, wherein the vibration drive stage is located within the vacuum package.

19. The method of claim 12, wherein the MEMS transmitter devices are formed within a plurality of vacuum packages arranged in a package array.

20. The method of claim 19, wherein the vibration drive stage is external to the vacuum packages of the package array.

* * * * *